US009380691B2

(12) United States Patent
Tao et al.

(10) Patent No.: US 9,380,691 B2
(45) Date of Patent: Jun. 28, 2016

(54) ADAPTIVE LASER SYSTEM FOR AN EXTREME ULTRAVIOLET LIGHT SOURCE

(71) Applicant: ASML Netherlands B.V., Veldhoven (NL)

(72) Inventors: Yezheng Tao, San Diego, CA (US); Daniel J. W. Brown, San Diego, CA (US); Alexander Schafgans, San Diego, CA (US); Michael David Caudill, San Diego, CA (US); Daniel J. Golich, San Diego, CA (US); Richard L. Sandstrom, Encinitas, CA (US); Yoshiho Amada, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 132 days.

(21) Appl. No.: 14/194,027

(22) Filed: Feb. 28, 2014

(65) Prior Publication Data
US 2015/0250045 A1    Sep. 3, 2015

(51) Int. Cl.
*H05G 2/00* (2006.01)
*H01S 3/10* (2006.01)
*H01S 3/13* (2006.01)

(52) U.S. Cl.
CPC .............. *H05G 2/008* (2013.01); *H01S 3/1003* (2013.01); *H01S 3/1301* (2013.01); *H01S 3/1305* (2013.01); *H05G 2/003* (2013.01)

(58) Field of Classification Search
USPC ..................................................... 250/504 R
See application file for complete search history.

(56) References Cited

U.S. PATENT DOCUMENTS

| 5,020,895 | A | 6/1991 | Giesen |
| 2010/0078577 | A1 | 4/2010 | Moriya |
| 2010/0078580 | A1 | 4/2010 | Endo |
| 2010/0117009 | A1 | 5/2010 | Moriya |
| 2010/0127191 | A1 | 5/2010 | Partlo et al. |
| 2012/0170112 | A1 | 7/2012 | Sandstrom |
| 2013/0020511 | A1 | 1/2013 | Kameda et al. |
| 2014/0072006 | A1* | 3/2014 | Sandstrom ............ H01S 3/1305 372/38.01 |

FOREIGN PATENT DOCUMENTS

DE    3900467    7/1990

OTHER PUBLICATIONS

International Search Report of the International Searching Authority for counterpart International Application No. PCT/EP2015/053763, mailed May 6, 2015, 6 pages.
Written Opinion of the International Searching Authority for counterpart International Application No. PCT/EP2015/053763, mailed May 6, 2015, 6 pages.
Application of Adaptive Optics for Controlling the NIF Laser Performance and Spot Size, Third Annual Conference on Solid State Lasers for Application to Inertial Confinement Fusion, Monterey, California, Jun. 7-12, 1998.
Instruction Manual for the II-VI Inc. Pump Pressurization System and Adaptive Mirror, II-IV Incorporated, Jan. 2006.
Variable Radius Mirrors (VRMs), Dynamically Change Beam Characteristics on the Fly, II-VI Incorporated, Jan. 2009.

* cited by examiner

*Primary Examiner* — Kiet T Nguyen
(74) *Attorney, Agent, or Firm* — DiBerardino McGovern IP Group LLC

(57) ABSTRACT

A system for an extreme ultraviolet (EUV) light source includes an optical amplifier including a gain medium positioned on a beam path, the optical amplifier configured to receive a light beam at an input and to emit an output light beam for an EUV light source at an output; a feedback system that measures a property of the output light beam and produces a feedback signal based on the measured property; and an adaptive optic positioned in the beam path and configured to receive the feedback signal and to adjust a property of the output light beam in response to the feedback signal.

20 Claims, 14 Drawing Sheets

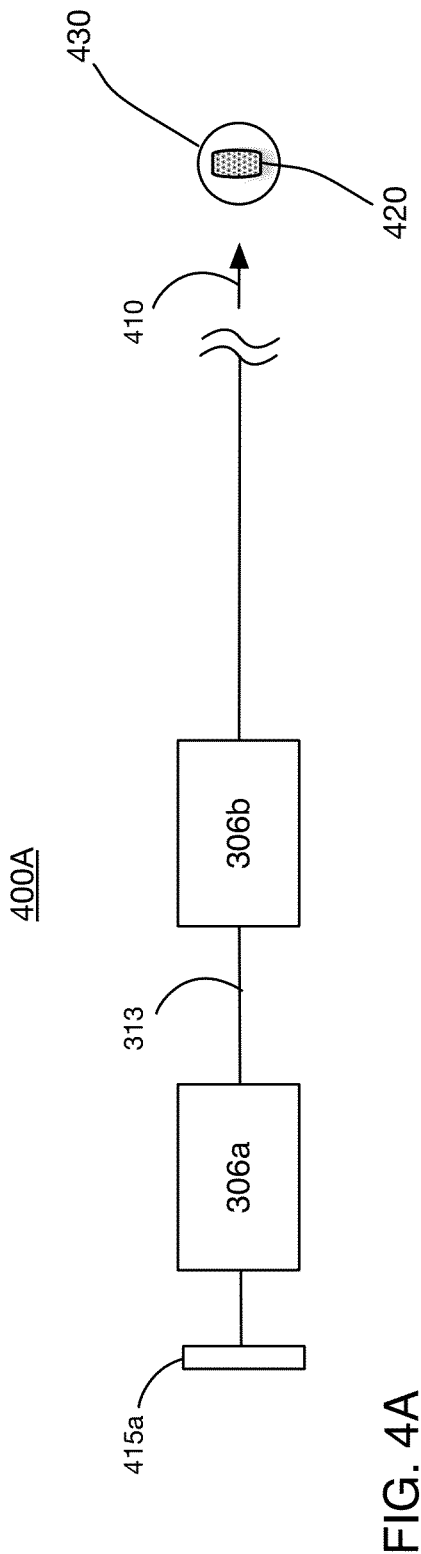
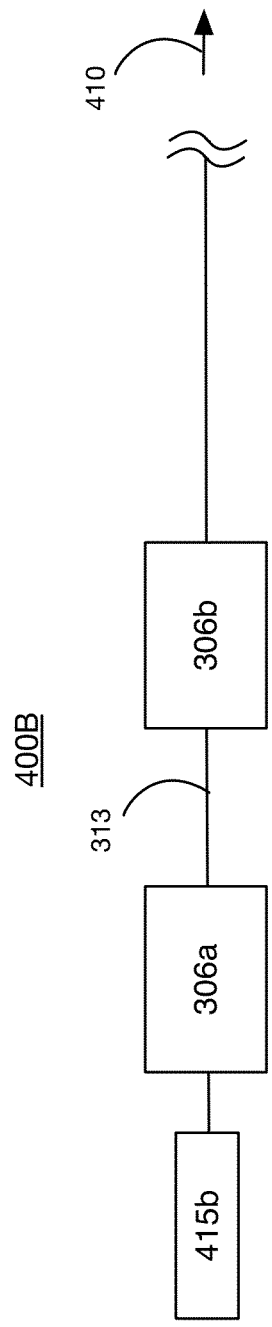
FIG. 4A
FIG. 4B

ADAPTIVE LASER SYSTEM FOR AN EXTREME ULTRAVIOLET LIGHT SOURCE

TECHNICAL FIELD

The disclosed subject matter relates to an adaptive laser system for an extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In one general aspect, an extreme ultraviolet (EUV) light source includes a source that produces an amplified light beam, the source including two or more optical amplifiers, each including a gain medium positioned on a beam path, and each optical amplifier configured to receive an input light beam that travels along the beam path at an input and to emit an output light beam at an output and onto the beam path; one or more adaptive optical elements positioned on the beam path, the adaptive optical elements being adjustable in response to a feedback signal; and a feedback system coupled to the one or more adaptive optical elements, the feedback system including a sensor positioned to receive radiation that propagates in the beam path and the feedback system configured to generate the feedback signal based on a property measured by the sensor; a vacuum chamber; a target material delivery system that directs target material toward a target location that is inside of the vacuum chamber and receives the amplified light beam, the target material comprising a material that emits extreme ultraviolet light when converted to plasma; and a collector inside the vacuum chamber, the collector positioned to receive and direct the emitted extreme ultraviolet light.

Implementations can include one or more of the following features. The one or more adaptive optical elements can include at least one adaptive optical element that includes an optical element including a deformable reflective surface at a first side and a second side in thermal communication with the first side; a fluid path including a first conduit in thermal communication with the second side of the optical element, the first conduit being configured to receive a thermally conductive fluid; and a pressure path comprising a second conduit in fluid communication with the first conduit and with a pressure actuator configured to provide and remove pressure from the first conduit.

At least one of the one or more adaptive optical elements can be positioned on the beam path between two of the two or more optical amplifiers.

The EUV light source also can include a spatial filter positioned at the output of at least one of the optical amplifiers.

At least one of the adaptive optical elements can change a length of the beam path in response to the feedback signal.

In another general aspect, a method for maintaining a property of an amplified light beam used to generate extreme ultraviolet light includes positioning an optical amplifier on a beam path, the optical amplifier comprising a gain medium on the beam path; positioning an adaptive optic on the beam path; emitting, from the optical amplifier, an amplified light beam associated with a duty cycle; determining a property of the amplified light beam; adjusting the adaptive optic to thereby maintain the property of the amplified light beam regardless of a variation in the duty cycle of the amplified light beam; and providing the amplified light beam to a target location that receives a target material to generate extreme ultraviolet light.

Implementations can include one or more of the following features. Adjusting the adaptive optic can include adjusting a radius of curvature of the adaptive optic to thereby adjust a beam divergence of the amplified light beam.

The adaptive optic can be adjustable in response to a feedback signal, and the method also can include generating the feedback signal based on a determined power of the amplified light beam; and providing the feedback signal to the adaptive optic.

Determining a property of the amplified light beam can include one or more of measuring a power of the amplified light beam, determining a beam size, and determining a waist location of the amplified light beam.

The property of the amplified light beam can include a beam waist location, and adjusting the adaptive optic to maintain the beam waist location comprises adjusting the adaptive optic to change a length of the beam path.

The property of the amplified light beam can be determined at a position that is inside of the optical amplifier.

The amplified light beam can be provided to a second optical amplifier on the beam path before being provided to the target location.

In another general aspect, a system for an extreme ultraviolet (EUV) light source includes an optical amplifier including a gain medium positioned on a beam path, the optical amplifier configured to receive a light beam at an input and to emit an output light beam for an EUV light source at an output; a feedback system that measures a property of the output light beam and produces a feedback signal based on the measured property; and an adaptive optic positioned in the beam path and configured to receive the feedback signal and to adjust a property of the output light beam in response to the feedback signal.

Implementations can include one or more of the following features. The feedback system can measure one or more of a power of the output light beam, a shape of the output light beam, and a size of the output light beam.

The system also can include a second optical amplifier comprising a gain medium, and the adaptive optic can be positioned between the second optical amplifier and the optical amplifier.

The adaptive optic can include a variable radius mirror (VRM).

The system can further include a second adaptive optic, and the adaptive optic and the second adaptive optic each include a variable radius mirror (VRM).

The system can also include a spatial filter on the beam path and between the second optical amplifier and the optical amplifier.

The system can also include a vacuum chamber; a target material delivery system that directs target material toward a target location in the vacuum chamber, the target location receiving the output light beam, and the target material including a material that emits extreme ultraviolet light when converted to plasma; and a collector that receives and directs the emitted extreme ultraviolet light.

The property can be a location of a beam waist of the output light beam, and the adaptive optic is a beam path length adjuster configured to change a length of the beam path in response to the feedback signal.

Implementations of any of the techniques described above may include an adaptive laser system for a laser produced plasma EUV light source, an EUV light source, an adaptive element for retrofitting a drive laser of an existing EUV light source, a method, a process, a device, executable instructions stored on a computer readable medium, or an apparatus. The details of one or more implementations are set forth in the accompanying drawings and the description below. Other features will be apparent from the description and drawings, and from the claims.

DRAWING DESCRIPTION

FIGS. 4A and 4B are block diagrams of exemplary drive laser systems for an EUV light source.

DETAILED DESCRIPTION

Techniques for controlling an optical property, such as a beam divergence, of a light beam emitted from and/or input into an optical amplifier are disclosed.

Figure 1:
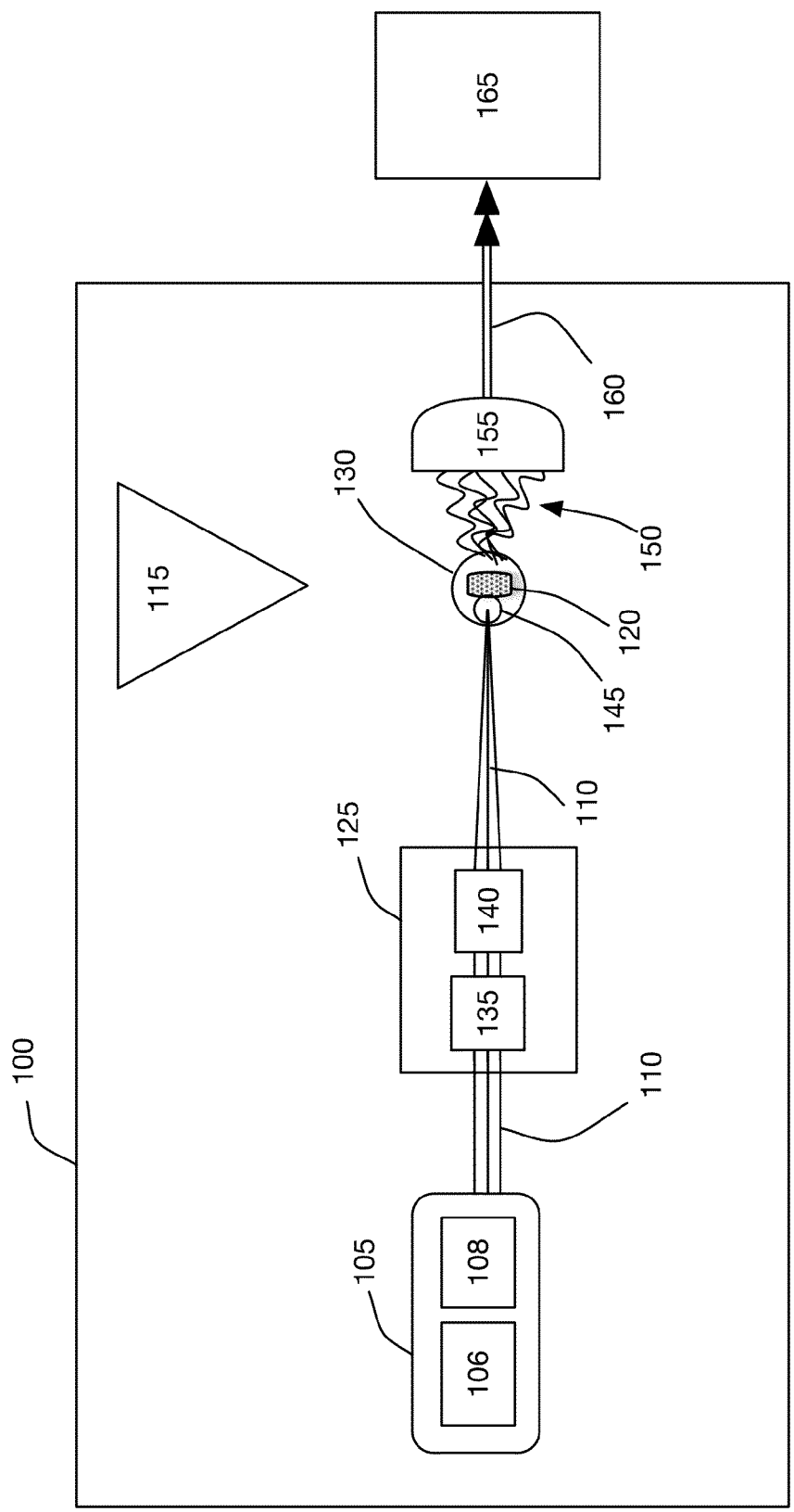
FIG. 1 is a block diagram of an exemplary laser produced plasma extreme ultraviolet light (EUV) source.

Referring to FIG. 1, an optical amplifier 106 forms at least part of an adaptive optical source 105 (a drive source or a drive laser) that is used to drive a laser produced plasma (LPP) extreme ultraviolet (EUV) light source 100. The optical source 105 produces an amplified light beam 110 that is provided to a target location 130. The target location 130 receives a target material 120, such as a tin droplet, and an interaction between the amplified light beam 110 and the target material 120 produces plasma that emits EUV light or radiation 150. A light collector 155 collects and directs the EUV light 150 toward an optical apparatus 165 such as a lithography tool.

The beam delivery system 125 can include a focus assembly 140 that focuses the amplified light beam 110 at the focal location 145. The components 135 can include optical elements, such as lenses and/or mirrors, which direct the amplified light beam 110 by refraction and/or reflection. The components 135 also can include elements that control and/or move the components 135. For example, the components 135 can include actuators that are controllable to cause optical elements of the beam delivery system 125 to move.

The amplified light beam 110 has a duty cycle, which is the portion or percentage of time during which the amplified light beam is ON. Operating the EUV light source 100 at a relatively high duty cycle (for example, a duty cycle of 70% or more) can result in greater production of EUV light. However, at a high duty cycle, the energy per pulse and the power over time of the amplified light beam 110 can be lower than that of an amplified light beam obtained with a low duty cycle (for example, a duty cycle lower than 70%). For example, the power of the amplified light beam 110 at a 90% duty cycle can be just 70% of the power of the amplified light beam with a relatively low duty cycle.

Controlling an optical property of the light beam can mitigate this effect. For example, the optical source 105 can include a plurality of optical amplifiers 106 arranged as a chain of amplifiers, with each amplifier positioned to further amplify the output of a previous optical amplifier. The light beam that is received by a subsequent optical amplifier has a beam size (or beam width), which is a diameter of a cross-section of the beam in a plane that is perpendicular to the direction of propagation of the beam, and a divergence, which is a measure of the increase in the beam width as the beam propagates away from a minimum size (the beam waist). When provided to the subsequent optical amplifier in the chain, the beam with a relatively smaller beam width interacts with a smaller volume of the gain medium of the optical amplifier than a beam with a greater beam width, leading to less amplification and a lower power amplified light beam 110. Changes in the duty cycle can affect the beam width and the beam divergence. For example, at a high duty cycle, the beam output by the optical amplifier 106 can have a beam width that is about 20% less than the beam width of the light beam output by the optical amplifier 106 at a low duty cycle. As such, controlling the divergence of the beam emitted from the optical amplifiers or controlling the position of the beam waist to ensure that the beam width is sufficient prior to being provided to a subsequent amplifier can mitigate the power losses at high duty cycles.

The techniques disclosed herein employ one or more adaptive optical elements 108 in the optical source 105 to control the divergence of the beam, and/or maintain a constant, or nearly constant, beam width and waist location regardless of variations in the duty cycle. The adaptive optical element 108 can be placed within the optical amplifier 106, at an output of the optical amplifier 106, or at an input of the optical amplifier 106.

Figure 2:
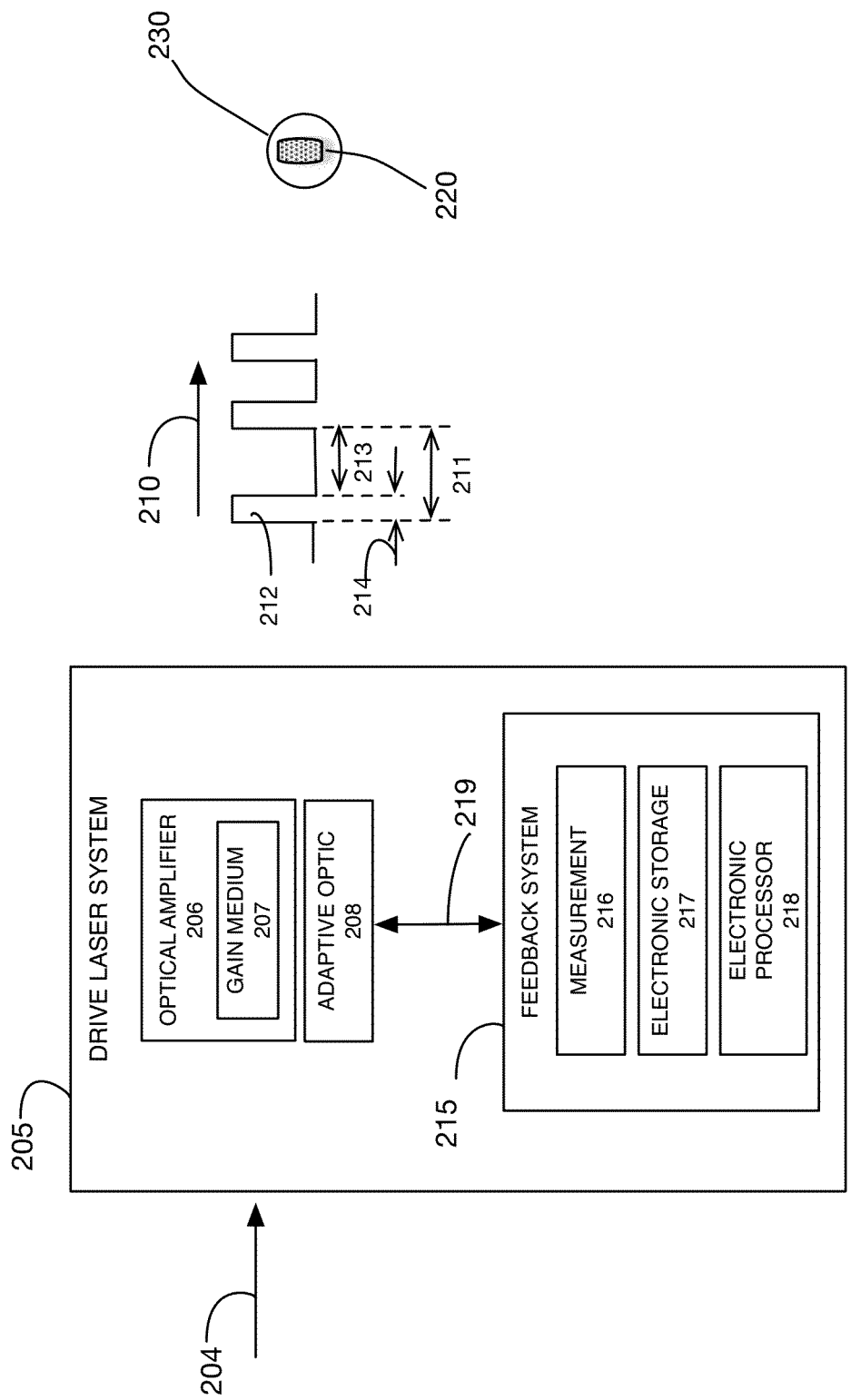
FIG. 2 is a block diagram of an exemplary adaptive drive laser system for an EUV light source.

Referring to FIG. 2, a block diagram of another exemplary adaptive drive laser system 205 is shown. The drive laser system 205 produces an amplified light beam 210 that is directed toward a target location 230. The drive laser system 205 can be used as the drive laser system 105 of the light source 100 (FIG. 1).

The drive laser system 205 includes an optical amplifier 206, which includes a gain medium 207, and an adaptive optic 208. The optical amplifier 206 receives an input beam 204 and produces an output beam. The gain medium 207 receives energy through pumping, and provides the energy to the input light beam 204 to amplify the input light beam 204 to form the amplified light beam 210. In the example of FIG. 2, the amplified light beam 210 is the output beam.

The amplified light beam 210 has a pulse 212 with a pulse width 214. During a cycle 211, the amplified light beam 210 is ON for a time that is equal to the pulse width 214, and the amplified light beam 210 has an OFF time 213. The duty cycle of the amplified light beam 210 is the portion of the cycle 211 during which the light beam is ON (the pulse width 214 in this example). In the example of FIG. 2, the cycle 211 includes the one pulse 212, however, in other examples, the cycle 211 can include additional pulses.

The drive laser system 205 also includes the adaptive optic 208. The adaptive optic 208 is an optical element that modifies a property of the amplified light beam 210 in response to receiving a feedback signal 219 from a feedback system 215. The adaptive optic 208 can be, for example, a variable radius mirror (VRM). A variable radius mirror has a deformable reflective surface with a variable radius of curvature. The presence of the radius of curvature causes a change in the divergence of a light beam that is incident on the reflective surface. The amount of change in the divergence depends on the radius of curvature, which is adjustable and controllable with the feedback system 215. Examples of using a VRM in an adaptive drive laser system are discussed below with respect to FIGS. 8, 9, and 12.

In another example, the adaptive optic 208 can be a beam path length adjuster that lengthens or shortens the optical path between the optical amplifier 206 and other elements of the drive laser system 205 in response to the feedback signal 219. Varying the optical path length changes the beam size at a particular location and the location of the beam waist. In this manner, the beam path length adjuster modifies a property of the amplified light beam 210. Examples of a beam path length adjuster in an adaptive drive laser system are discussed below with respect to FIGS. 10 and 12.

The adaptive drive laser system 205 also includes the feedback system 215. The feedback system 215 includes a measurement module 216, an electronic storage 217, and an electronic processor 218. The measurement module 216 can include a sensor that measures a property of the amplified light beam 210. The property can be, for example, an energy or power of the amplified light beam 210. A measurement from the measurement module 216 can be used to determine the property. For example, the property can be a power in the beam over an amount of time, a beam divergence, a beam shape, a beam width, and/or a beam waist location.

The measured property is used to generate the feedback signal 219, which acts on the adaptive optic 208 to cause an adjustment to the adaptive optic 208. For example, in implementations that include a VRM as the adaptive optic 208, the feedback signal 219 acts on the adaptive optic 208 to change a pressure at one side of the deformable reflective surface, producing a corresponding change in the shape of the deformable reflective surface. Thus, the deformable reflective surface adjusts to a radius of curvature that provides a reflected beam with a particular divergence.

The electronic storage 217 stores instructions that, when executed by the electronic processor 218, allows the measurement module 216 to, for example, collect data and determine a property of the beam. The storage 217 also can store data sensed by the measurement module 216, and/or instructions for retrieving the data from the measurement module 216.

The storage 217 is an electronic memory module, and the storage 217 may be a non-volatile or persistent memory. The storage 217 may be volatile memory, such as RAM. In some implementations, the storage 217 may include both non-volatile and volatile portions or components. The processor 218 may be a processor suitable for the execution of a computer program such as a general or special purpose microprocessor, and any one or more processors of any kind of digital computer. Generally, a processor receives instructions and data from a read-only memory or a random access memory or both. The processor 218 receives data from the components of the feedback system 215 and uses the data to, for example, determine a property of the beam 210. In some implementations, the feedback system 215 includes more than one processor.

Figure 3:
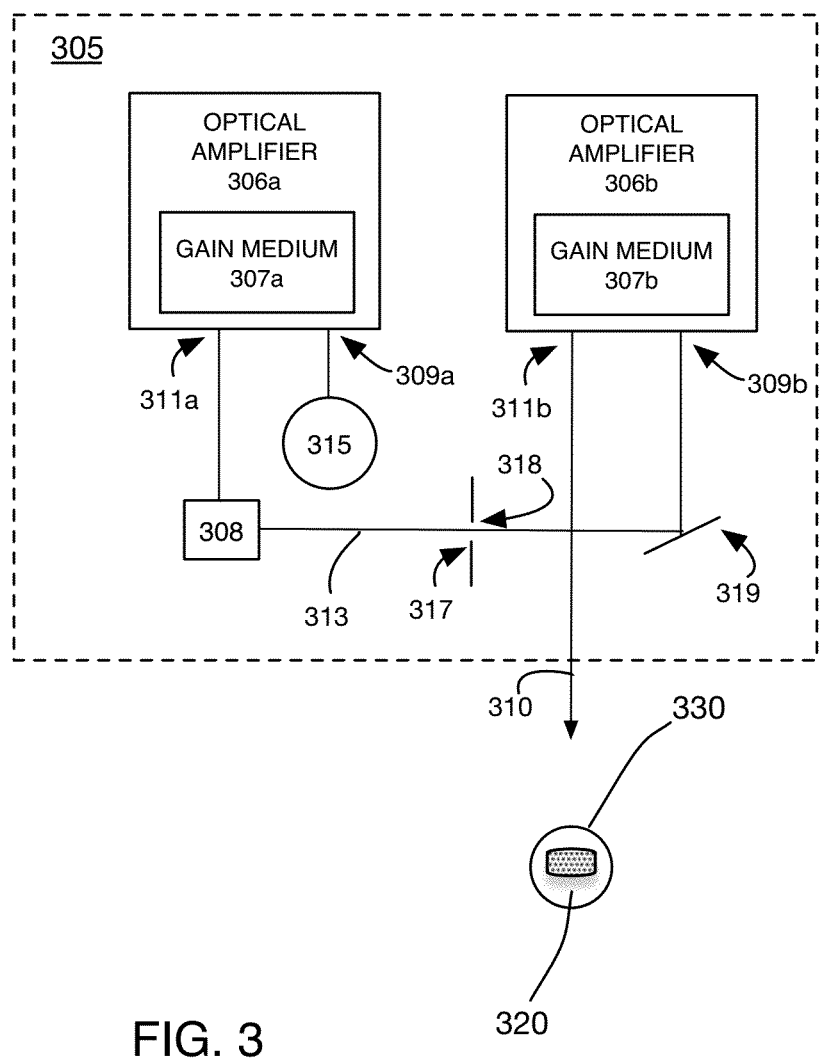
FIG. 3 is a block diagram of another exemplary adaptive drive laser system for an EUV light source.

FIG. 3 shows a block diagram of another exemplary adaptive drive laser system 305. The drive laser system 305 provides an amplified light beam 310 to a target location 330. The target location 330 receives target material 320 that, when converted to plasma, emits EUV light. The drive laser system 305 includes two optical amplifiers 306a and 306b, and an adaptive optical element 308. The optical amplifiers 306a and 306b include inputs 309a, 309b, outputs 311a and 311b, and gain mediums 307a and 307b, respectively. The input 309a receives a light beam from a light input 315. When activated, the gain mediums 307a, 307b provide energy to a propagating light beam to produce an amplified light beam that has a greater energy than the light beam that entered the optical amplifier.

The gain media 307a, 307b and the adaptive optical element 308 are placed on an optical path 313. The optical path 313 can be all or part of a path between the light input 315 and the output 311b, and the optical path 313 can have any spatial form. In the example shown, the adaptive optical element 308 is on the optical path 313, positioned between the output 311a and the input 309a. In this configuration, the adaptive optical element 308 can, for example, adjust the divergence of the light beam that exits the output 311a before that light beam reaches the input 309b of the optical amplifier 306b.

The drive laser system 305 also can include a spatial filter 317 positioned on the beam path 313. The spatial filter 317 defines an aperture 318 through which light passes. As discussed in greater detail with respect to FIG. 8, the spatial filter 317 reduces the amount of reflections to the optical amplifier 306a. The drive laser system also can include a reflective element 319. The reflective element 319 can be a mirror. In some implementations, the optical element 319 can be an adaptive optical element.

Referring also to FIGS. 4A and 4B, the light input 315 can be a reflective element, such as a mirror 415a (FIG. 4A) or a separate laser 415b that provides a laser beam to the input 309a (FIG. 4B). As shown in FIG. 4A, in some implementations, the light input 315 is a mirror 415a. In this implementation, the drive laser system 305 is configured as a so-called "self-targeting" laser system 400A in which a target material 420 serves as one mirror of the optical cavity. The target material 420 can be similar to the target material 120 (FIG. 1). The target material 420 is received at a target location 430. In some "self-targeting" arrangements, a master oscillator may not be required. The laser system 400A includes the optical amplifiers 306a, 306b, which have the gain media 307a, 307b, as shown in FIG. 3. The optical amplifiers 306a, 306b can have their own excitation source, for example, pumping electrodes. The optical amplifiers 306a, 306b can have a chamber that can be a radio frequency (RF) pumped, fast axial flow, $CO_2$ amplifier chamber having a combined one pass gain of, for example, $10^3$-$10^6$ for amplifying light of a wavelength λ of, for example, 10600 nm. The amplifier chamber can be designed without laser cavity (resonator) mirrors so that when set up alone it does not include the optical components needed to pass the amplified light beam 310 through the gain medium more than once. Nevertheless, as mentioned above, a laser cavity can be formed as follows.

In this implementation, a laser cavity can be formed by using the reflective optic 415a as the light input 315 and placing the target material 420 at the target location 430. The reflective optic 415a can be, for example, a flat mirror, a curved mirror, a phase-conjugate mirror, or a corner reflector having a reflectivity of greater than about 90% for wavelengths of about 10600 nm (the wavelength of the amplified light beam 310 if $CO_2$ amplifier chambers are used). The target material 420 and the reflecting optic 415a act to reflect some of the amplified light beam 310 back into the laser system 400A along the beam path 313 to form the laser cavity. Thus, the presence of the target material 420 at the target location 430 provides enough feedback to cause the laser system 400A to produce coherent laser oscillation. In this case, the amplified light beam 310 (FIG. 3) can be considered a laser beam.

When the target material 420 is absent from the target location 430, the laser system 400A may still be pumped to produce the amplified light beam 310 but it would not produce a laser oscillation unless some other component within the laser system 400A provides enough feedback. In particular, during the intersection of the amplified light beam 310 with the target material 420, the target material 420 may reflect light along the beam path 404, cooperating with the optic 415a to establish an optical cavity passing through the optical amplifiers 306a, 306b. The arrangement is configured so the reflectivity of the target material 420 is sufficient to cause optical gains to exceed optical losses in the cavity (formed from the optic 415a and the target material 420) when the gain media 307a, 307b within the optical amplifiers 306a, 3056b are excited generating a laser beam for irradiating the target material 420, creating a plasma, and producing an EUV light emission 150 (FIG. 1).

With this arrangement, the optic 415a, the optical amplifiers 305a, 305b, and the target material 420 combine to form a so-called "self-targeting" laser system in which the target material 420 serves as one mirror (a so-called plasma mirror or mechanical q-switch) of the optical cavity. Self-targeting laser systems are disclosed in "Drive Laser Delivery Systems for EUV Light Source," U.S. application Ser. No. 11/580,414, filed on Oct. 13, 2006 (the '414 application), the entire contents of which are hereby incorporated by reference herein.

Referring to FIG. 4B, another exemplary drive laser system 400B is shown. The drive laser system 400B is a master oscillator/power amplifier (MOPA) configuration having a seed pulse that is initiated by a master oscillator (or a seed laser) 415b and is fed into the optical amplifier 306a. The optical amplifier 306a can amplify the pulse output from the master oscillator 415b, for example, using an RF pumped, fast axial flow, $CO_2$ amplifier to produce the amplified light beam 310.

Although the examples of FIGS. 3, 4A, and 4B show a system that includes two optical amplifiers, more or fewer optical amplifiers can be used. Additionally, although $CO_2$ amplifier chambers are provided as an example, depending on the application, other types of amplifiers or lasers can also be suitable, for example, an excimer or molecular fluorine laser operating at high power and high pulse repetition rate. Additional examples include a solid state laser, for example, having a fiber or disk shaped gain medium, a MOPA configured excimer laser system, as shown, for example, in U.S. Pat. Nos. 5,625,191; 5,549,551; and 5,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; an arrangement in which the power amplifier is a regenerative ring amplifier; or a solid state laser that seeds one or more excimer or molecular fluorine amplifier or oscillator chambers, may be suitable. Other designs are possible.

Figure 5:
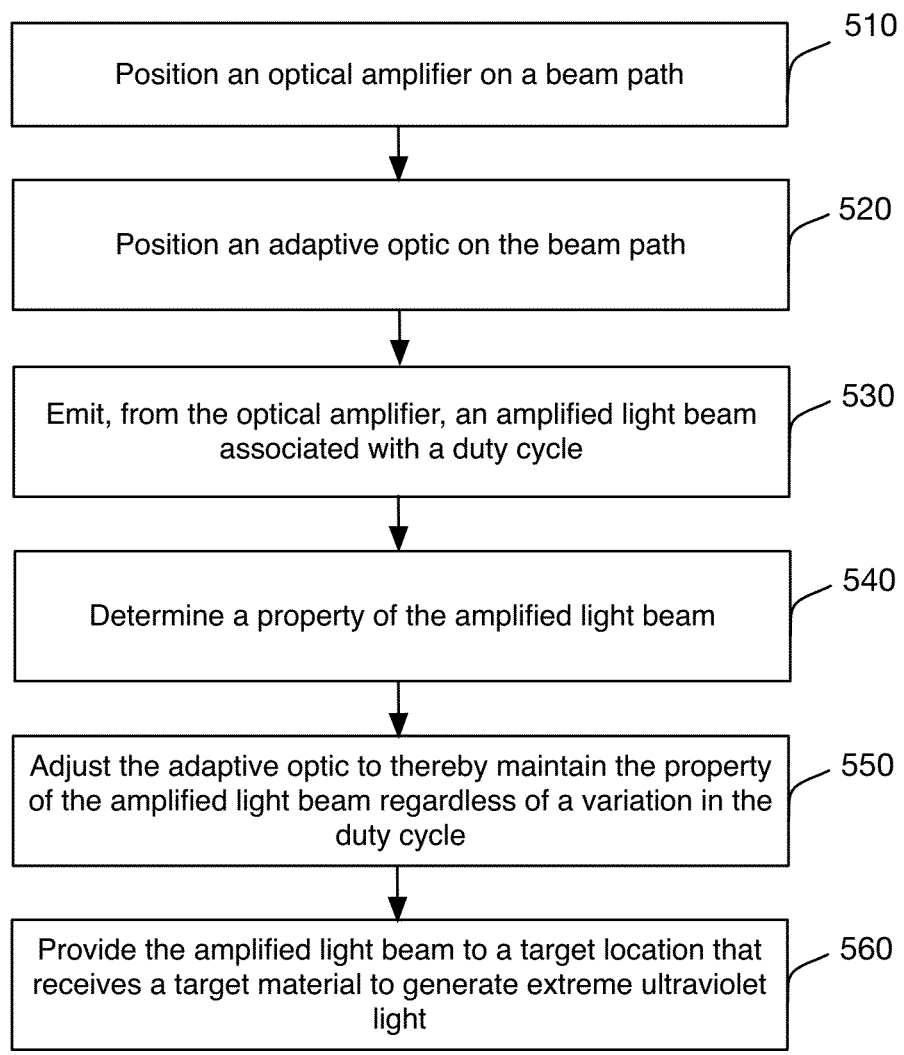
FIG. 5 is a flow chart of an exemplary process for maintaining a property of an amplified light beam.

Referring to FIG. 5, a flowchart of an exemplary process 500 for maintaining a property of an amplified light beam is shown. The process 500 is discussed with reference to the drive laser system 305 (FIG. 3). However, the process 500 can be performed on any optical source that generates an amplified light beam that interacts with a target material to produce EUV light.

The optical amplifier 306a is positioned on the beam path 313 (510). The adaptive optic 308 is positioned on the beam path 313 (520). An amplified light beam is emitted from the optical amplifier 306a, and the amplified light beam is associated with a duty cycle (530). The amplified light beam can be the light beam that is emitted directly from the amplifier 306a or an amplified light beam that has been amplified further by amplifiers downstream from the amplifier 306a (such as the amplifier 306b). The duty cycle of the amplified light beam can be set by, for example, activating and deactivating RF electrodes so that the gain medium 307a is pumped with energy. When the gain medium 307a is pumped with energy, a light beam passing through the gain medium 307a absorbs the energy and is amplified. When the gain medium 307a is not pumped with energy, the light beam passes through the amplifier 306a without being amplified. The rate at which the RF electrodes are activated and deactivated, therefore, determines the duty cycle of the amplified light beam.

A property of the amplified light beam is determined (540). The property of the amplified light beam can be, for example, the power of the amplified light beam over a period of time, or the energy of the amplified light beam at a particular time. The property of the emitted amplified light beam can be a beam size, which can be a diameter or width of the amplified light beam in a plane that is perpendicular to the direction of propagation of the amplified light beam. The property of the amplified light beam can be a divergence of the amplified light beam. The property can be measured at any point on the beam path 313, inside or outside of the amplifiers 306a and 306b.

The adaptive optical element 308 is adjusted (550). The adjustment of the adaptive optical element 308 results in the property of the amplified light beam being maintained even if the duty cycle changes. For example, the radius of curvature of the adaptive optical element 308 can be adjusted so that the divergence of the amplified light beam remains the same regardless of changes in duty cycle. In the absence of the adaptive optic, a duty cycle of 90% can decrease the divergence of the amplified light beam, whereas a duty cycle of 10% does not cause a decrease in the divergence of the amplified light beam. To maintain the divergence when the duty cycle changes from 10% to 90%, the adaptive optical element 308 increases the radius of curvature to increase the divergence of the amplified light beam. The adaptive optical element 308 can adjust the radius of curvature in response to a feedback signal (such as the feedback signal 219 of FIG. 2).

The amplified light beam is provided to the target location 230 to interact with the target material 220 and generate EUV light (560).

Figure 6:
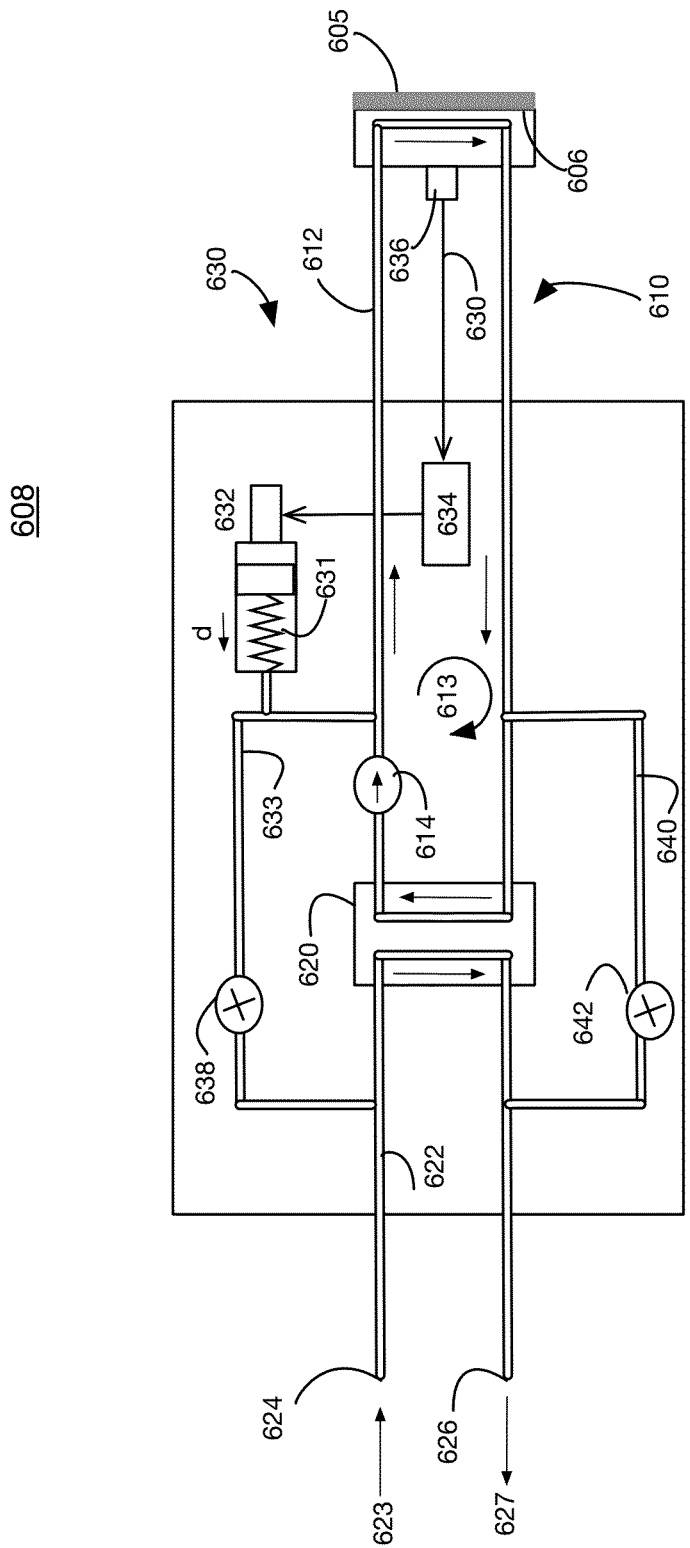
FIG. 6 is a block diagram of an exemplary variable radius mirror (VRM).

Referring to FIG. 6, a block diagram of an exemplary variable radius mirror (VRM) 608 is shown. The VRM 608 can be used as the adaptive optic 108, 208, or 308 in the exemplary laser systems 105, 205, and 305 of FIGS. 1, 2, and 3, respectively. The VRM 608 includes a reflective surface 605 that deforms in response to pressure variations applied to a side 606. The VRM 608 includes a fluid circuit 610 that circulates a fluid that removes heat from the reflective surface 605 and a separate pressure circuit 630 that varies the pressure at the side 606. The separation of the fluid and pressure circuits reduces vibration of the reflective surface 605 as compared to a VRM in which the flow rate of the fluid itself and/or a restriction in the conduit that carries the fluid is used to control the pressure at the deformable surface.

The fluid circuit 610 includes a conduit 612 through which the fluid circulates. The conduit 612 forms a loop, and the fluid can flow through the loop in a clockwise direction 613. The fluid flows near the side 606 of the reflective surface 605, carrying heat away from the reflective surface 605. The fluid can be a liquid or a gas, such as, for example, water, air, a coolant, or any other fluid that can remove heat from the side 606 of the reflective surface 605.

The pressure circuit 630 includes a pressure actuator 632 and a pressure controller 634, and a pressure transducer 636. The pressure actuator 632 is fluidly coupled to a conduit 633, which is fluidly coupled to the conduit 612. The pressure actuator 632 acts to increase or decrease the pressure in the conduit 633, and the increase or decrease in the pressure in the conduit 633 has a corresponding effect on the pressure in the conduit 612 and the side 606 of the reflective surface 605. In the example of FIG. 6, the pressure actuator 632 is a piston force actuator. The pressure in the conduit 633 increases when a spring piston 631 is moved in a direction "d" and decreases when the spring piston 631 is moved in a direction opposite to the direction "d."

The pressure transducer (or pressure sensor) 636 measures the pressure at the side 606 of the reflective surface 605, and the pressure transducer 636 provides an electrical signal to the pressure controller 634. The pressure controller 634 controls the pressure actuator 632 to provide more or less pressure into the conduit 633.

The VRM 608 also includes a heat exchanger 620 that receives a conduit 622 that carries a coolant in the form of a fluid, which can be a liquid or a gas (such as, for example, water). The conduit 622 receives a relatively cool fluid 623 at an inlet 624, passes the cool fluid 623 through the heat exchanger 620, where the cool fluid 623 absorbs heat from the fluid returned from the reflective surface 605 and becomes a relatively warm fluid 627. The heated fluid 627 exits the VRM 608 through an outlet 626. In this manner, the fluid flowing in the conduit 612 removes heat from the reflective surface and is then cooled in the heat exchanger 620 before recirculating to the side 606 of the reflective surface 505.

The fluid circuit 610 also includes a pump 614. The pump 614 can be, for example, a gear pump. The pump 614 causes the fluid to flow in the conduit 612, but the pump does not generate pressure changes at the side 606. For example, the pump 614 does not cause the flow rate of the fluid in the conduit 612 to change to cause a corresponding change in pressure at the side 606. Moreover, the conduit 612 lacks a restriction downstream (in the direction 613) of the side 606 that, if present, would restrict the flow of fluid in the conduit 612 and cause pressure to build up at the side 606 of the reflective surface 605. The conduit 612 also lacks such a restriction upstream (in the direction 613) of the side 606. Instead, the pressure actuator 632 increases and decreases the pressure at the side 606.

Generating the pressure changes at the side 606 with the pressure actuator 632 instead of a restriction and/or variations in flow rate can result in reduction or elimination in extraneous vibrations of the reflective surface 605. Additionally, because the pressure circuit 630 and the fluid circuit 610 are separate, the pressure at the surface 605 can be controlled even in the absence of a fluid flowing through the conduit 612. As such, the VRM 608 can be used, for example, in a system that has operating modes that benefit from having heat removed from the reflective surface 605 as well as operating modes that do not require heat removal.

The VRM 608 also can include a conduit 640 that couples the conduit 622 to the conduit 612 through a valve 642. Opening the valve 642 allows fluid to flow between the conduits 622 and 612 so that the conduit 622 can be filled or drained of fluid. Further, the conduit 633 can be coupled to the conduit 622 through a valve 638.

Figure 7:
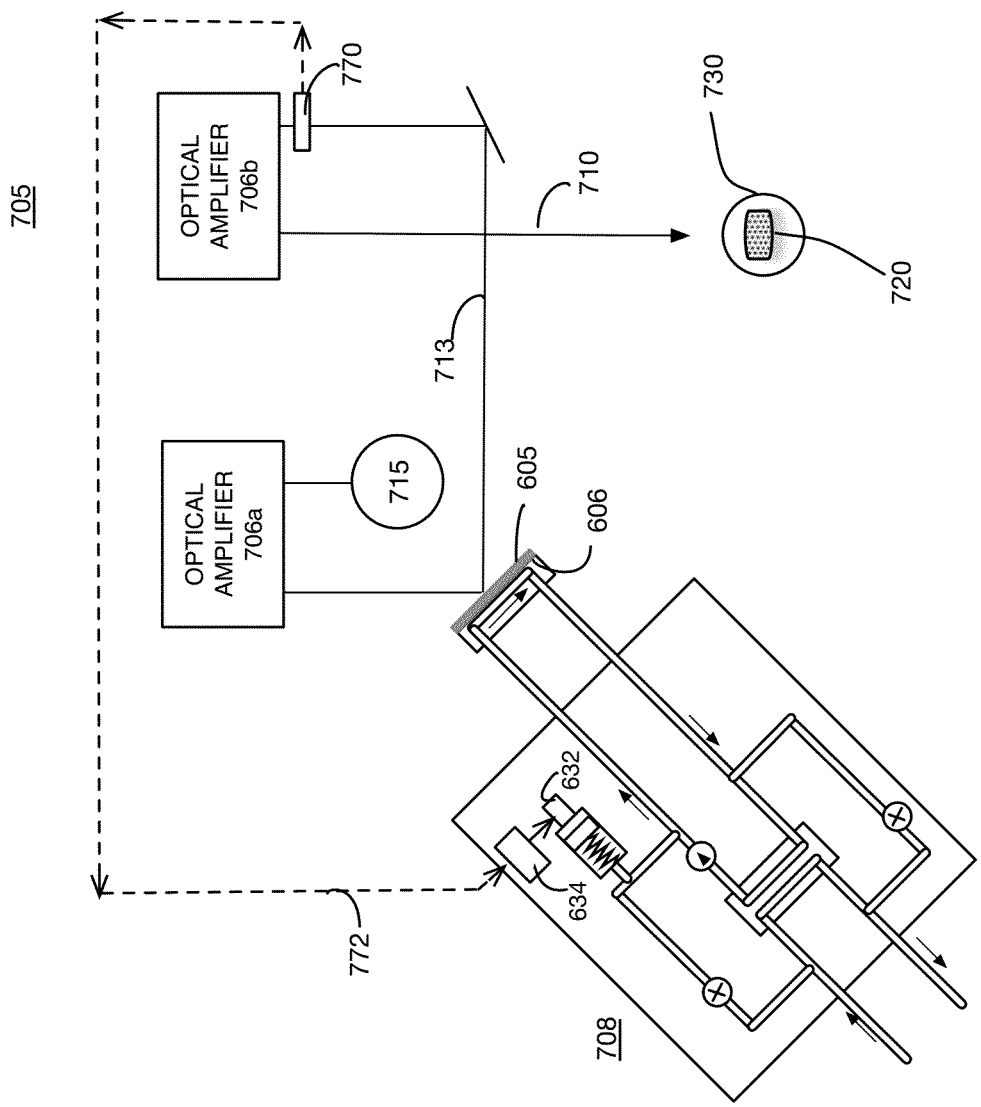
FIG. 7 is a block diagram of an exemplary drive laser system for an EUV light source that includes the VRM of FIG. 6.

Referring to FIG. 7, a block diagram of an exemplary drive laser system 705 that includes a variable radius mirror (VRM) 708 is shown. The drive laser system 705 includes optical amplifiers 706a and 706b that produce an amplified light beam 710. The amplified light beam 710 is directed to a target location 730 that receives a target material 720. An interaction between the amplified light beam 710 and the target material 720 converts the target material into plasma that emits EUV light. The drive laser system 705 also includes a measurement sensor 770 positioned on a beam path 713. In the example of FIG. 7, the measurement sensor 770 is positioned at the input of the optical amplifier 706b. The measurement sensor 770 measures the beam size of the light beam and generates a feedback signal 772, which is provided to the VRM 708.

The VRM 708 is another implementation of the VRM 608 of FIG. 6. The VRM 708 is the same as the VRM 608, except that, in the VRM 708, the pressure controller 634 receives the feedback signal 772 from the measurement sensor 770 instead of from the pressure transducer 636 (FIG. 6). The pressure controller 634 acts on the pressure actuator 632 to cause the pressure at the side 606 to increase or decrease depending on the beam size measured by the measurement sensor 770.

Although the measurement sensor 770 is located at the input of the optical amplifier 706b in the example of FIG. 7, the measurement sensor 770 can be positioned in other locations. For example, the measurement sensor 770 can be positioned to measure the size of the amplified light beam 710 in the target location 730. In other examples, the measurement sensor 770 can be located inside the optical amplifier 706b or 706b, or at the output of the amplifier 706a. More than one measurement sensor 770 can be used, and the more than one measurement sensors 770 can be placed at different locations.

Figure 8:
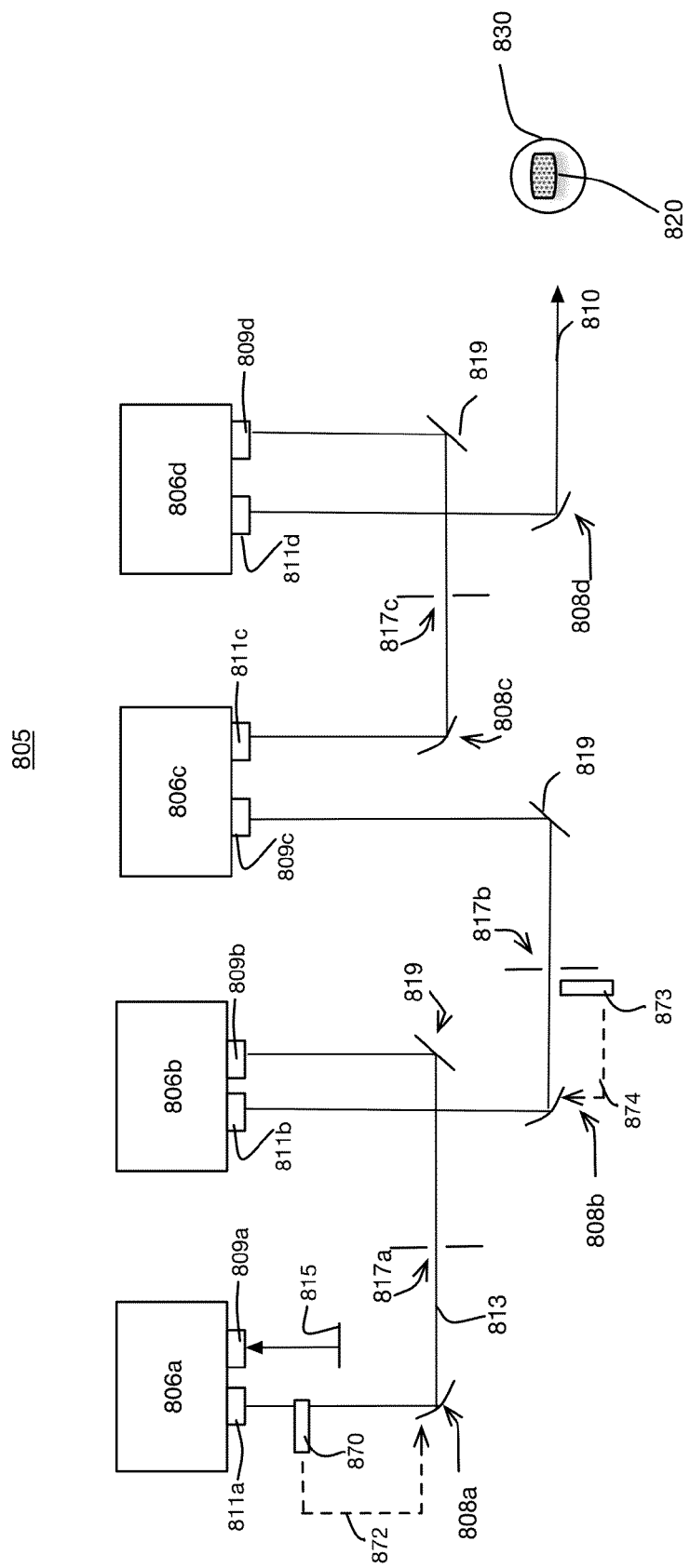
FIGS. 8 and 9 are block diagrams of other exemplary drive laser systems that include one or more VRMs.

Referring to FIG. 8, a block diagram of another exemplary adaptive drive laser system 805 is shown. The drive laser system 805 generates an amplified light beam 810 that is provided to a target location 830. An interaction between a target material 820 and the amplified light beam generates plasma that emits EUV light.

The drive laser system 805 includes optical amplifiers 806a-806d positioned on an optical path 813. Each of the optical amplifiers 806a-806d includes a gain medium (not shown), an input 809a-809d, and an output 811a-811d, respectively. Collectively, the amplifiers 806a-806d form an amplifier chain on the beam path 813, with the input of the optical amplifiers 806b-806d receiving the light from the output of the preceding (upstream) optical amplifiers 808a-806c, respectively. The input 809a of the amplifier 806a receives a beam from a light input 815. The light input 815a can be a reflective optic (such as the optic 415a discussed in FIG. 4A) or a seed laser (such as the seed laser 415b discussed in FIG. 4B). The drive laser system 805 also includes reflective elements 819 that are placed on the beam path 813 and direct light into the inputs 809b-809d. The reflective elements 819 can be, for example, flat mirrors.

The drive laser system 805 also includes an adaptive optical element 808a-808d at the output of each of the amplifiers 806a-806d, respectively. The gain media in the optical amplifiers 806a-806d can act like a lens, changing the amount of divergence of a light beam that propagates through the media. The amount of change to the divergence can vary with the duty cycle. To counter this effect, adaptive optical elements 808a-808d are positioned on the beam path 813 in locations that receive a light beam output by the respective optical amplifier 806a-806d.

The adaptive optical elements 808a-808d can be VRMs, such as the VRM 708 discussed with respect to FIG. 7. As VRMs, each of the adaptive optical elements 808a-808d has a deformable reflective surface that changes shape in response to a feedback signal. In the example shown in FIG. 8, the adaptive optical element 808a receives a feedback signal 872 from a sensor 870 that measures the size of the beam output by the amplifier 806a. The adaptive optical element 808b receives a feedback signal from a sensor 873 that measures the pointing of the beam reflected from the adaptive optical element 808b.

The sensor 870 measures the size of the beam output by the amplifier 806a. If the measurement from the sensor 870 indicates that the beam size is larger than expected, the reflective surface of the adaptive optical element 806a contracts to have a smaller radius of curvature to compensate for the divergence caused by the gain medium. If the size of the beam from the amplifier 806a is smaller than expected, the feedback signal 872 causes the radius of curvature of the adaptive optical element 808a to increase.

The sensor 873 is positioned on the beam path 813 just upstream of the spatial filter 817a. The sensor 873 measures the pointing of the beam that travels along the path 813 and generates a feedback signal 874. If the beam is not entering the aperture of the spatial filter 817b, the adaptive optic 808b adjusts the pointing based on the feedback signal 874.

The adaptive optical elements 808c and 808d also receive feedback signals (not shown). The feedback signals can be from sensors that are placed on the beam path 813, inside or outside of the optical amplifiers 806a-806d, and measure a property of the beam at a particular location. In addition to, or instead of, measuring the light beam at the output of the amplifier 806a, the beam size can be measured at any other location on the beam path 813. In some implementations, the feedback signal can come from a sensor that is outside of the beam path 813 and/or does not sense an optical property of a light beam propagating along the beam path 813, such as a pressure transducer that measures pressure at a side of the reflective surface.

The adaptive laser system 805 also includes spatial filters 817a-817c positioned on the beam path 813. The spatial filters 817a-817c can be, for example, pinholes, each defining an aperture that is centered on the beam path 813. Each spatial filter 817a-817c can be positioned to have its aperture coincide with the expected location of the beam waist of the light beam that exits from the amplifier output 811a-811c, respectively. The spatial filter 817a is positioned between the amplifiers 806a and 806b, the spatial filter 817b is between the amplifiers 806b and 806c, and the spatial filter 817c is between the amplifiers 806c and 806d.

Having a spatial filter between each amplifier isolates the drive laser system 805 from the target location 830. The spatial filters 817a-817c help isolate the amplifiers from the target location 830 by reducing the amount of power that travels back from the target location 830 to the amplifiers 806a-806d. The interaction between the target material 820 and the amplified light beam 810 can produce reflections that propagate away from the target location 830 in a direction that is opposite to the direction that the light beam 810 propagates. These reflections can enter the amplifier chain and are referred to as a reverse beam. A reverse beam can cause gain stripping of the amplifier gain media. Gain stripping occurs when a stray beam (such as a reverse beam) passes through the gain medium and becomes amplified by absorbing energy from the pumped-up gain medium. After gain stripping occurs, the gain medium must be pumped up again before another beam can be amplified.

Thus, the reverse beam can take amplification energy that would otherwise be provided to a subsequent forward beam (a beam that propagates along the path 813 being amplified by the amplifier chain into the amplified light beam 810 that interacts with the target material 820 to create plasma). The divergence of the reverse beam is different than the divergence of the forward beam. As a result, placing the spatial filters 817a-817c between the amplifiers helps to reduce the amount of reverse power that reaches the amplifiers 806a-806c, which, in turn, increases the amount of energy provided to the target material 820, thereby also increasing the amount of EUV light produced.

Additionally, in implementations in which the optical input 815 is a master oscillator (or seed laser), the spatial filters also help to reduce or eliminate self-lasing between the amplifier chain (the amplifiers 806a-806d) and the seed laser 815. Light beams that arise from self-lasing also have a different divergence than the forward beam. Thus, positioning the spatial filters 807a-807c to coincide with the beam waist of a forward beam emitted from an output 811a-811c allows more of the forward beam to reach the target location 830 and/or downstream amplifiers while blocking much of the self-lasing beam. Mitigation of the self-lasing allows the gain of the amplifiers 806a-806d to be increased, which also increases the power of the amplified light beam 810.

Figure 9:
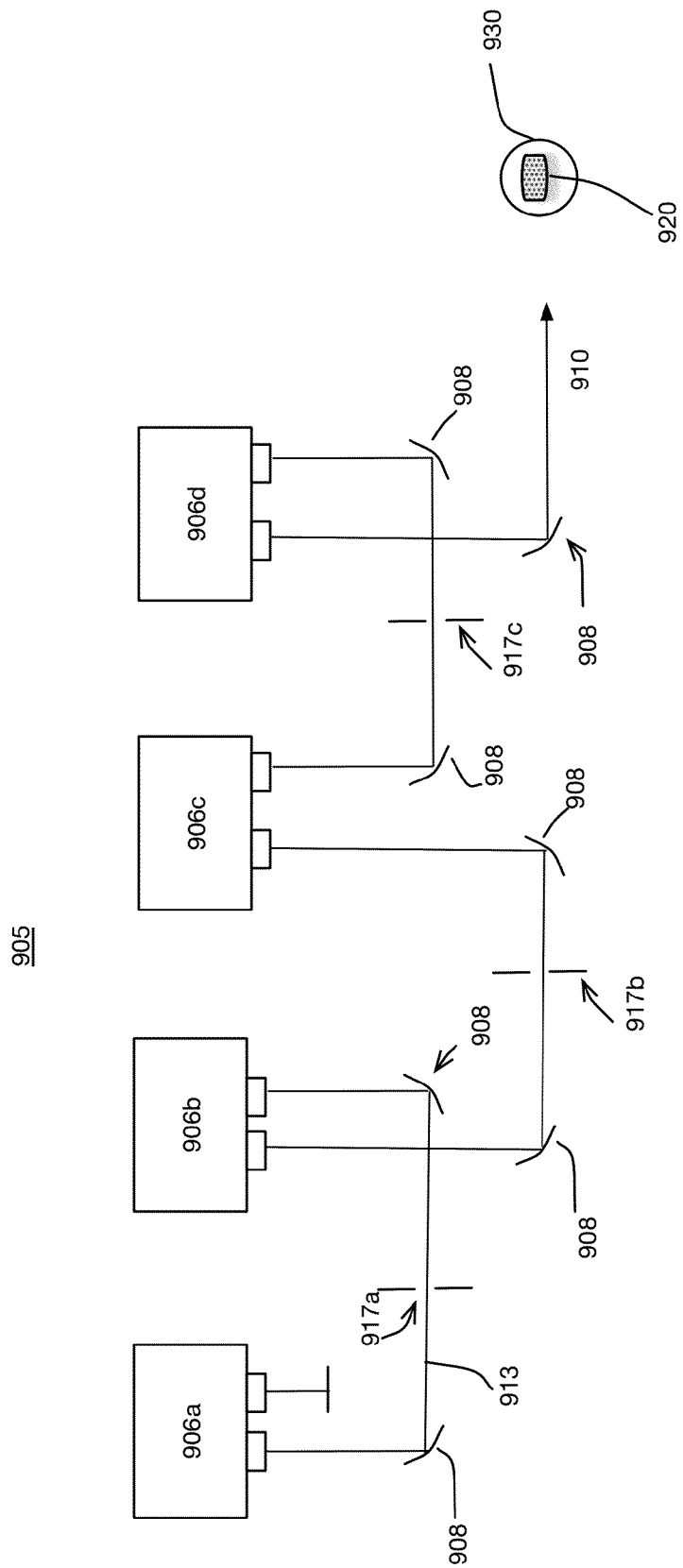

Referring to FIG. 9, a block diagram of another exemplary adaptive drive laser system 905 is shown. The adaptive drive laser system 905 includes optical amplifiers 906a-906d, spatial filters 917a-917c, and a plurality of adaptive optical elements 908. The adaptive optical elements 908 can be VRMs, such as the VRM 608 (FIG. 6) or the VRM 708 (FIG. 7). The adaptive drive laser system 905 is similar to the system 805 of FIG. 8, except the drive laser system 905 has an adaptive optical element 908 at the input and output of amplifiers 906b-906c. Having an adaptive optic at the input and output of an amplifier allows control of the beam divergence and the beam size.

Although the example adaptive laser drive systems 805 and 905 show four optical amplifiers, more or fewer optical amplifiers can be used.

Figure 10:
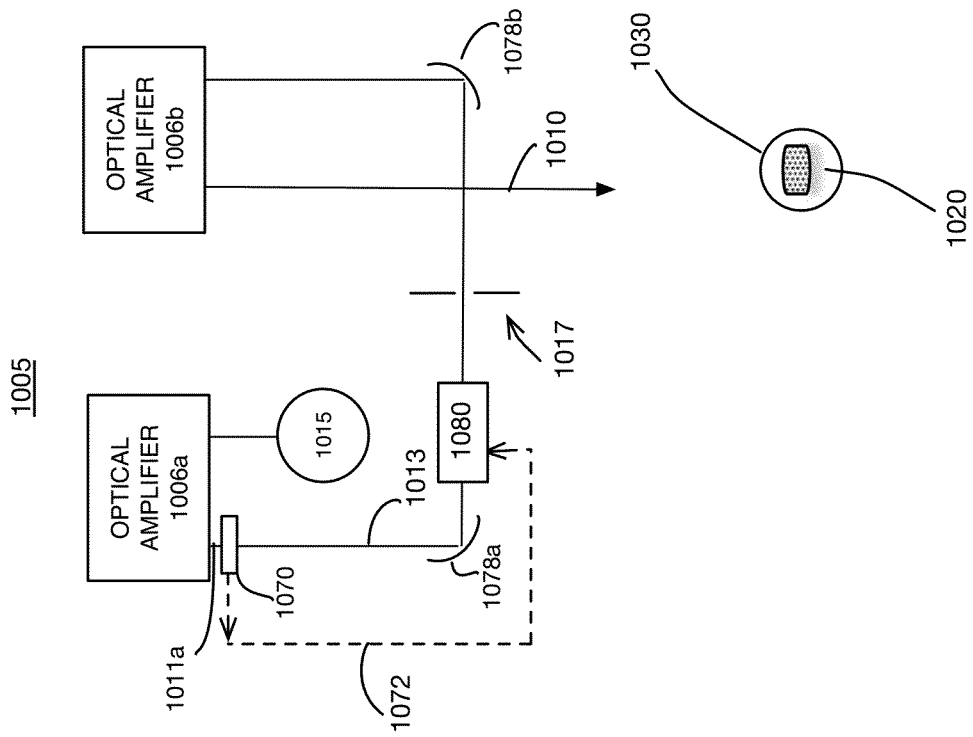
FIG. 10 is a block diagram of another exemplary adaptive drive laser system.

Referring to FIG. 10, a block diagram of another exemplary adaptive drive laser system 1005 is shown. The adaptive drive laser system 1005 produces an amplified light beam 1010 that interacts with a target material 1020 in a target location 1030 to convert the target material to plasma that emits EUV light.

The laser system 1005 includes optical amplifiers 1006a and 1006b, static reflective optical elements 1078a and 1078b, a spatial filter 1017, and an adaptive element 1080 positioned on an optical path 1013. The system 1005 also includes a sensor 1070 that provides a feedback signal 1072 to the adaptive element 1080. The optical amplifier 1006a receives a light beam from a light input 1015, which can be a reflective optic (such as the optic 415a discussed in FIG. 4A) or a seed laser (such as the seed laser 415b discussed in FIG. 4B). Light propagates from the light input 1015, through the amplifiers 1006a and 1006b, and toward the target location 1030 along the optical path 1013.

The static reflective optical elements 1078a and 1078b are placed on the path 1013 and can be, for example, off-axis parabolic (OAP) mirrors. The optical elements 1078a and 1078b are static elements in that they have a fixed radius of curvature. The aperture of the spatial filter 1017 is on the optical path 1013 in a location that coincides with an expected location of the beam waist of a beam that is output from the optical amplifier 1006a. The adaptive element 1080 is positioned between the amplifier 1006a and 1006b. The adaptive element 1080 increases or decreases the length of the beam path 1013, particularly the portion of the path 1013 that is between an output 1011a of the optical amplifier 1006a and the spatial filter 1017. The length of the beam path 1013 can be adjusted with the adaptive element 1080 to keep the beam waist of the beam that is emitted from the optical amplifier 1006a coincident with the aperture of the spatial filter 1017 despite variations in system operating conditions (such as changes in the duty cycle).

The sensor 1070 is positioned to measure the divergence or size of the beam that the optical amplifier 1006a outputs. The sensor 1070 produces the feedback signal 1072 and provides the signal 1072 to the adaptive element 1080. If the output of the amplifier 1006a has a greater than expected or desired divergence, the beam waist is further from the amplifier 1006a than expected or desired. In this case, the adaptive element 1080 decreases the length of the path 1013 so that the beam waist of the output beam coincides with the spatial filter. If the output of the amplifier 1006a has a smaller than expected divergence, the adaptive element 1080 increases the length of the path 1013.

Figure 11A:
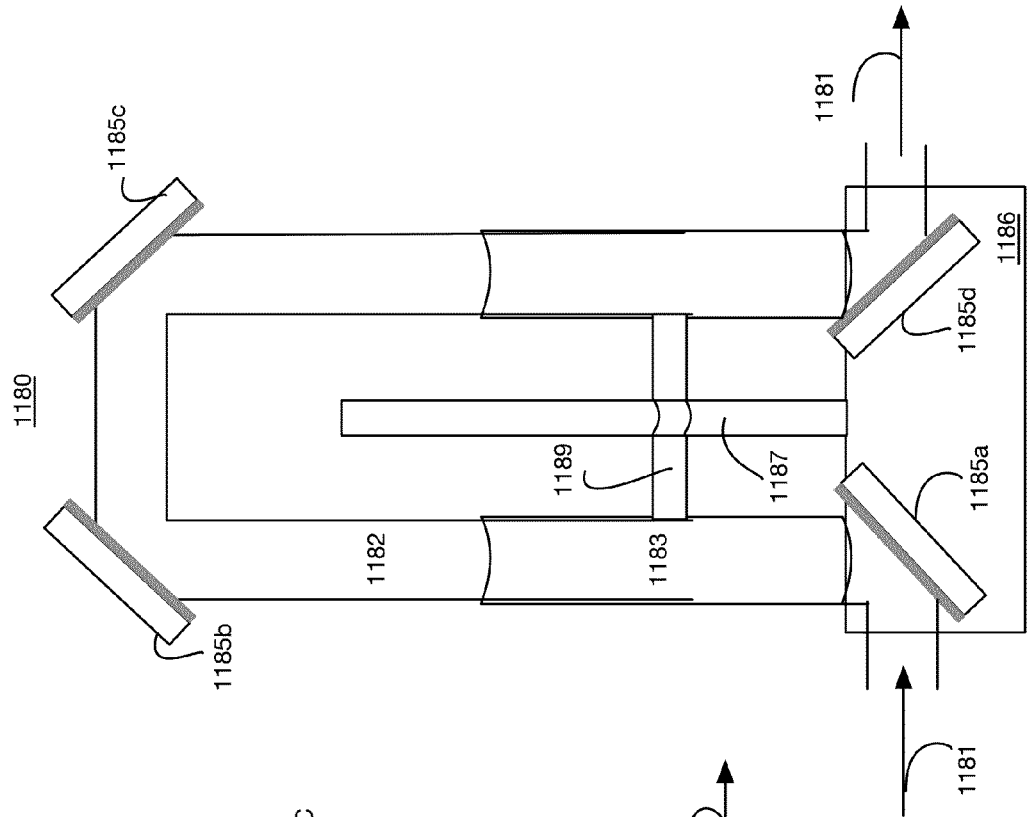
FIG. 11A is a plan view of an exemplary beam path length adjuster in a compressed state.
Figure 11B:
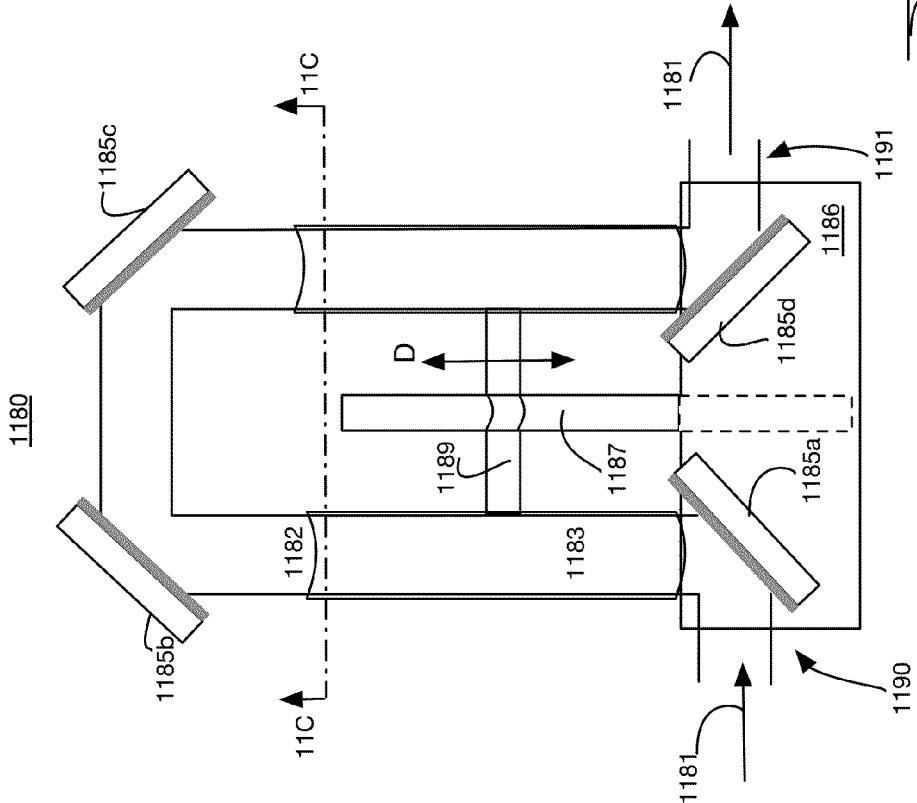
FIG. 11B is a plan view of the beam path length adjuster of FIG. 11A in an extended state.

Referring also to FIGS. 11A and 11B, a top view of an exemplary adaptive element 1180 is shown. The adaptive element 1180 is referred to as a beam path length adjuster and can be used as the adaptive element 1080 in the system 1005 (FIG. 10). FIG. 11A shows the beam path length adjuster 1180 in a compressed state (a shortened beam path) and FIG. 11B shows the beam path length adjuster 1180 in an extended state (an elongated beam path).

Figure 11C:
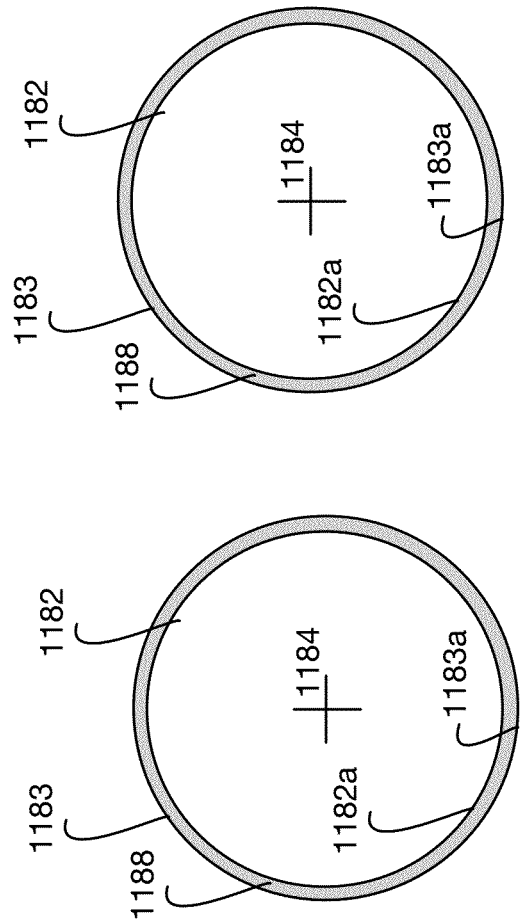
FIG. 11C is a cross-sectional view of the beam path length adjuster of FIG. 11A taken along line 11C-11C of FIG. 11A.

The beam path length adjuster 1180 includes an inner conduit 1182, an outer conduit 1183, and reflective optics 1185a-1185d, which can be water-cooled. Referring also to FIG. 11C, which shows a cross-sectional view of the beam path length adjuster 1180 taken along the line 11C-11C of FIG. 11A, the inner conduit 1182 and the outer conduit 1183 are arranged concentrically, with a portion of the outer conduit 1183 surrounding the inner conduit 1182.

The inner conduit 1182 has an inner wall 1182a, and the outer conduit 1183 has an inner wall 1183a. The inner walls 1182a and 1183a define a central longitudinal axis 1184. Light travels through the beam path length extender 1180 along the axis 1184. The interior of the conduits 1182 and 1183 are hollow and can be free space or another material but provides a path of constant index of refraction through the beam path length adjuster 1180. The inner walls 1182a and 1183a can be made from or coated with, for example, black anodized aluminum, or any other material that absorbs the wavelength of the light beam produced by the adaptive drive laser system in which the beam path length adjuster 1180 is used. The outer conduit 1183 and the inner conduit 1182 are coupled with a low friction or frictionless element 1188 between the inner wall 1183a of the outer conduit and the inner conduit 1182. The low friction element 1188 can be, for example, TEFLON or TEFLON composite, or an air gap. The low friction element 1188 allows the outer conduit 1183 to slide relative to the inner conduit 1182.

Referring again to FIGS. 11A and 11B, the beam path extender 1180 also includes a base 1186 that receives the inner conduit 1182 and the outer conduit 1183. The base 1186 also supports the reflective optical elements 1185a and 1185b. Extending from the base 1186 is a stem 1187 that receives a slider 1189. The slider 1189 is attached to the outer conduit 1183, and the slider 1189 moves along the stem 1187 in directions as shown by the arrow "D." When the slider 1189 moves along the stem 1187 in the directions "D," the outer conduit 1183 also moves. However, because the outer conduit 1183 and the outer conduit 1182 are coupled only with the low friction element 1188, the inner conduit 1182 does not move with the slider 1189. In this manner, moving the slider 1189 back and forth along the direction "D" causes the path length of the path length adjuster 1180 to increase and decrease. The path length adjuster 1180 can produce a change in the path length of, for example, +/−200 millimeters (mm).

In use, the path length adjuster 1180 receives a light beam 1181 at an input 1190. The beam 1181 reflects from the reflective optic 1185a into the inner conduit 1182, travels along the axis 1184, reflects from the reflective optics 1185b and 1185c to be directed to the reflective optic 1185d. The beam 1181 then exits the beam path extender 1180 through an output 1191. The movement of the slider 1189 can be manual or through a computer control (such as a computer-controlled stepper motor coupled to the slider 1189).

To use the beam path length adjuster 1180 in an adaptive drive laser system such as the system 1005 (FIG. 10), the input 1190 and the output 1191 are placed on the beam path 1013 so that the light propagating on the beam path 1013 enters the beam path length adjuster 1180.

Although the beam path length adjuster 1180 is shown as having a circular cross-section, any conduit that allows light to pass and provides for the sliding engagement between an inner conduit and an outer conduit can be used.

Figure 12:
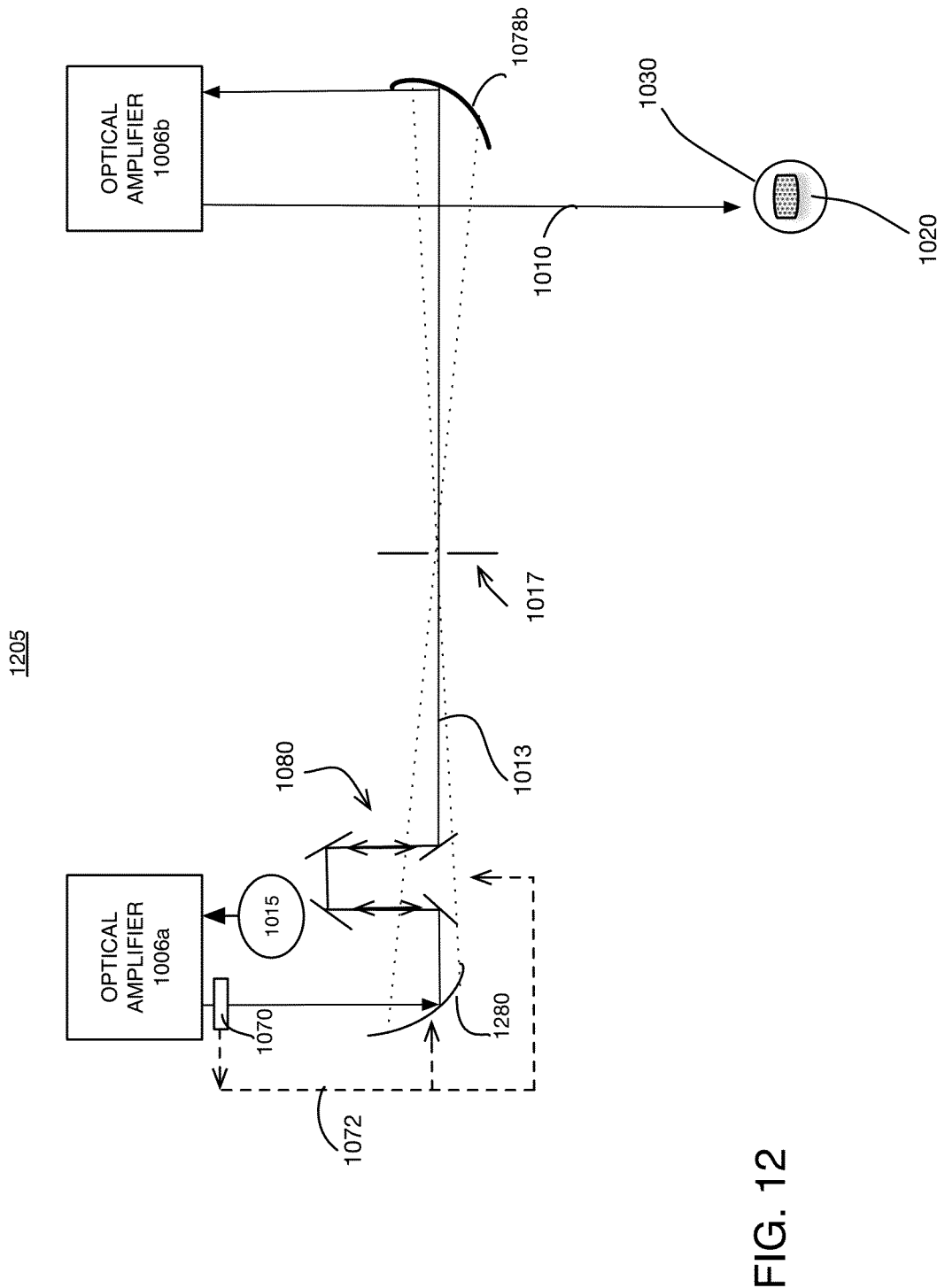
FIG. 12 is a block diagram of another exemplary adaptive drive laser system.

FIG. 12 shows a block diagram of another exemplary adaptive drive laser system 1205. The adaptive drive laser system 1205 is similar to the adaptive drive laser system 1005 (FIG. 10), except the static mirror 1078a is replaced with an adaptive optic 1208. The adaptive optic 1280 can be a variable radius mirror, such as the VRM 708 (FIG. 7).

Figure 13:
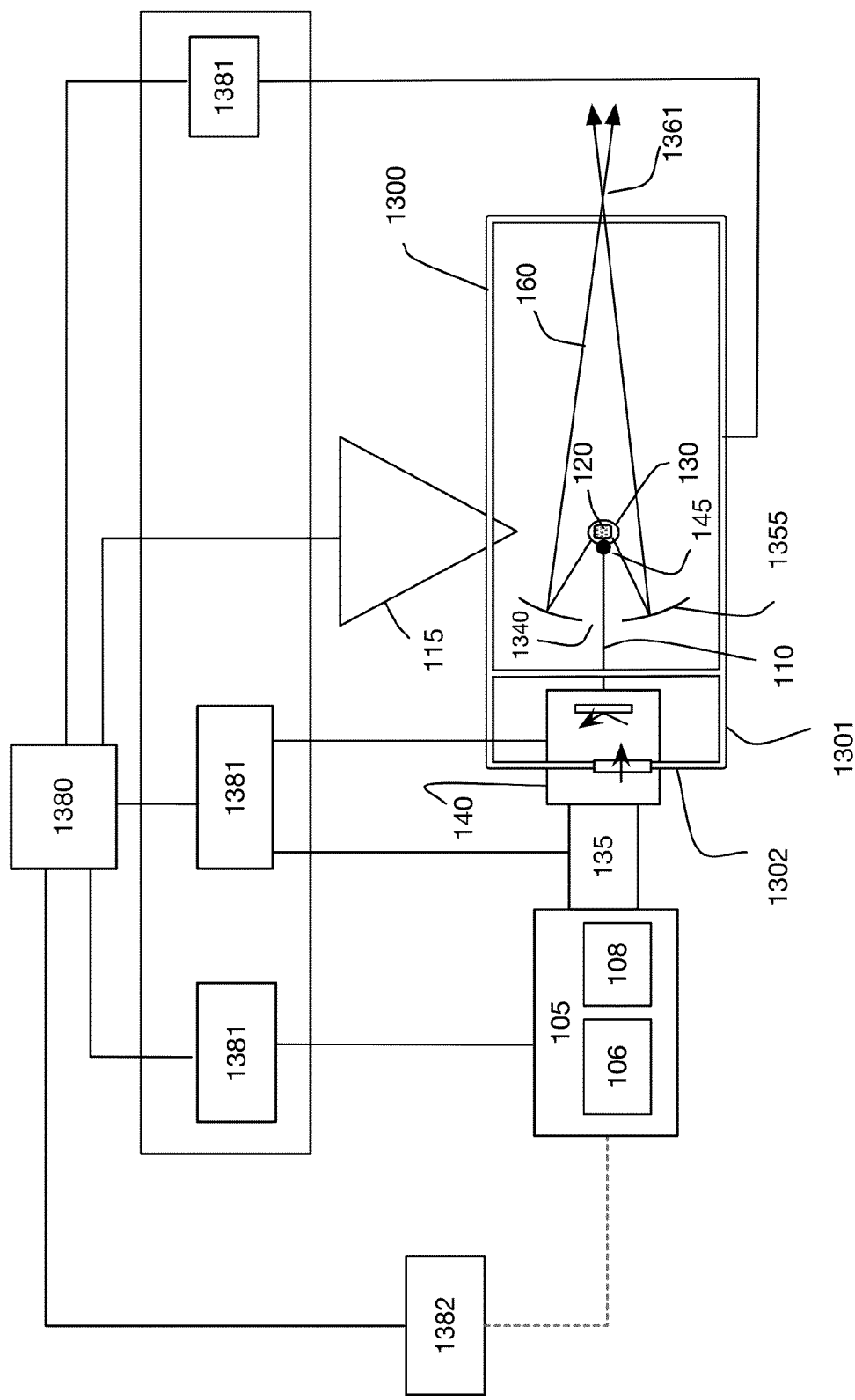
FIG. 13 is a block diagram of an exemplary laser produced plasma extreme ultraviolet light (EUV) source.

Referring to FIG. 13, in some implementations, the extreme ultraviolet light system 100 is a part of a system that includes other components, such as a vacuum chamber 1300, one or more controllers 1380, one or more actuation systems 1381, and a guide laser 1382.

The vacuum chamber 1300 can be a single unitary structure or it can be set up with separate sub-chambers that house specific components. The vacuum chamber 1300 is at least a partly rigid enclosure from which air and other gases are removed by a vacuum pump, resulting in a low-pressure environment within the chamber 1300. The walls of the chamber 1300 can be made of any suitable metals or alloys that are suitable for vacuum use (can withstand the lower pressures).

The target material delivery system 115 delivers the target material 120 to the target location 130. The target material 120 at the target location can be in the form of liquid droplets, a liquid stream, solid particles or clusters, solid particles contained within liquid droplets or solid particles contained within a liquid stream. The target material 120 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 120 can include a wire coated with one of the above elements, such as tin. If the target material 120 is in a solid state, it can have any suitable shape, such as a ring, a sphere, or a cube. The target material 120 can be delivered by the target material delivery system 115 into the interior of the chamber 1300 and to the target location 130. The target location 130 is also referred to as an irradiation site, the place where the target material 120 optically interacts with the amplified light beam 110 to produce the plasma.

The drive laser system 105 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the drive laser system 105 produces the amplified light beam 110 due to the population inversion in the gain media of the laser amplifiers even if there is no laser cavity. Moreover, the drive laser system 105 can produce an amplified light beam 110 that is a coherent laser beam if there is a laser cavity to provide enough feedback to the drive laser system 105. The term "amplified light beam" encompasses one or more of: light from the drive laser system 105 that is merely amplified but not necessarily a coherent laser oscillation and light from the drive laser system 105 that is amplified and is also a coherent laser oscillation.

The optical amplifiers in the drive laser system 105 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the drive laser system 105 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the drive laser system 105 can also include a cooling system such as water that can be used when operating the drive laser system 105 at higher powers.

The light collector 155 can be a collector mirror 1355 having an aperture 1340 to allow the amplified light beam 110 to pass through and reach the focal location 145. The collector mirror 1355 can be, for example, an ellipsoidal mirror that has a first focus at the target location 130 or the focal location 145, and a second focus at an intermediate location 1361 (also called an intermediate focus) where the EUV light 160 can be output from the extreme ultraviolet light system and can be input to the optical apparatus 165.

The one or more controllers 1380 are connected to the one or more actuation systems or diagnostic systems, such as, for example, a droplet position detection feedback system, a laser control system, and a beam control system, and one or more target or droplet imagers. The target imagers provide an output indicative of the position of a droplet, for example, relative to the target location 130 and provide this output to the droplet position detection feedback system, which can, for example, compute a droplet position and trajectory from which a droplet position error can be computed either on a droplet by droplet basis or on average. The droplet position detection feedback system thus provides the droplet position error as an input to the controller 1380. The controller 1380 can therefore provide a laser position, direction, and timing correction signal, for example, to the laser control system that can be used, for example, to control the laser timing circuit and/or to the beam control system to control an amplified light beam position and shaping of the beam transport system to change the location and/or focal power of the beam focal spot within the chamber 1300.

The target material delivery system 115 includes a target material delivery control system that is operable in response to a signal from the controller 1380, for example, to modify the release point of the droplets as released by an internal delivery mechanism to correct for errors in the droplets arriving at the desired target location 130.

Additionally, extreme ultraviolet light system can include a light source detector that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector generates a feedback signal for use by the controller 780. The feedback signal can be, for example, indicative of the errors in parameters such as the timing and focus of the laser pulses to properly intercept the droplets in the right place and time for effective and efficient EUV light production.

In some implementations, the drive laser system 105 has a master oscillator/power amplifier (MOPA) configuration with multiple stages of amplification and having a seed pulse that is initiated by a Q-switched master oscillator (MO) with low energy and high repetition rate, for example, capable of 100 kHz operation. From the MO, the laser pulse can be amplified, for example, using RF pumped, fast axial flow, $CO_2$ amplifiers to produce the amplified light beam 110 traveling along a beam path.

Although three optical amplifiers can be used, it is possible that as few as one amplifier and more than three amplifiers could be used in this implementation. In some implementations, each of the $CO_2$ amplifiers can be an RF pumped axial flow $CO_2$ laser cube having a 10 meter amplifier length that is folded by internal mirrors. Alternatively, the drive laser system 105 can be configured as a so-called "self-targeting" laser system in which the target material 120 serves as one mirror of the optical cavity. An example of a "self-targeting" laser system is discussed with respect to FIG. 4B.

At the irradiation site, the amplified light beam 110, suitably focused by the focus assembly 140, is used to create plasma having certain characteristics that depend on the composition of the target material 120. These characteristics can include the wavelength of the EUV light 160 produced by the plasma and the type and amount of debris released from the plasma. The amplified light beam 110 evaporates the target material 120, and heats the vaporized target material to a critical temperature at which electrons are shed (a plasma state), leaving behind ions, which are further heated until they start emitting photons having a wavelength in the extreme ultraviolet range.

Other implementations are within the scope of the following claims.

What is claimed is:
1. An extreme ultraviolet light source comprising:
a source configured to produce an amplified light beam, the source comprising:
two or more optical amplifiers, each comprising a gain medium positioned on a beam path, and each optical amplifier configured to receive an input light beam that travels along the beam path at an input and to emit an output light beam at an output and onto the beam path;

one or more adaptive optical elements positioned on the beam path, the adaptive optical elements being adjustable in response to a feedback signal; and a feedback system coupled to the one or more adaptive optical elements, the feedback system comprising a sensor, the sensor positioned at an output of one of the optical amplifiers, the feedback system being configured to: generate the feedback signal based on a property measured by the sensor, and provide the feedback signal to a corresponding adaptive optical element, the corresponding adaptive optical element being at least one of the adaptive optical elements, and the corresponding adaptive optical element being positioned between the output of the one of the optical amplifiers and the input of another of the optical amplifiers, wherein the sensor is between the corresponding adaptive optical element and the output of the one of the optical amplifiers;

a vacuum chamber;

a target material delivery system that directs target material toward a target location that is inside of the vacuum chamber and receives the amplified light beam, the target material comprising a material that emits extreme ultraviolet light when converted to plasma; and a collector inside the vacuum chamber, the collector positioned to receive and direct the emitted extreme ultraviolet light.

2. The extreme ultraviolet light source of claim 1, wherein the one or more adaptive optical elements comprise at least one adaptive optical element comprising:

an optical element comprising a deformable reflective surface at a first side and a second side in thermal communication with the first side;

a fluid path comprising a first conduit in thermal communication with the second side of the optical element, the first conduit being configured to receive a thermally conductive fluid; and a pressure path comprising a second conduit in fluid communication with the first conduit and with a pressure actuator configured to provide and remove pressure from the first conduit.

3. The extreme ultraviolet light source of claim 1, further comprising a spatial filter positioned at the output of at least one of the optical amplifiers.

4. The extreme ultraviolet light source of claim 1, wherein at least one of the adaptive optical elements changes a length of the beam path in response to the feedback signal.

5. A method for maintaining a property of an amplified light beam used to generate extreme ultraviolet light, the method comprising:

positioning an optical amplifier on a beam path, the optical amplifier comprising a gain medium on the beam path;

positioning an adaptive optic on the beam path;

emitting, from the optical amplifier, an amplified light beam on to the beam path, the amplified light beam being associated with a duty cycle, the amplified light beam propagating from the optical amplifier toward the adaptive optic;

measuring a property of the amplified light beam at an output of the optical amplifier, the property being measured between the optical amplifier and the adaptive optic;

determining a property of the amplified light beam based on the measurement;

adjusting the adaptive optic based on the determined property to thereby maintain the property of the amplified light beam regardless of a variation in the duty cycle of the amplified light beam; and providing the amplified light beam to a target location that receives a target material to generate extreme ultraviolet light.

6. The method of claim 5, wherein adjusting the adaptive optic comprises adjusting a radius of curvature of the adaptive optic to thereby adjust a beam divergence of the amplified light beam.

7. The method of claim 6, wherein the adaptive optic is adjustable in response to a feedback signal, and further comprising:

generating the feedback signal based on a determined power of the amplified light beam; and providing the feedback signal to the adaptive optic.

8. The method of claim 5, wherein determining a property of the amplified light beam comprises one or more of measuring a power of the amplified light beam, determining a beam size, and determining a waist location of the amplified light beam.

9. The method of claim 5, wherein the property of the amplified light beam comprises a beam waist location, and adjusting the adaptive optic to maintain the beam waist location comprises adjusting the adaptive optic to change a length of the beam path.

10. The method of claim 5, wherein the property of the amplified light beam is determined at a position that is inside of the optical amplifier.

11. The method of claim 5, wherein the amplified light beam is provided to a second optical amplifier on the beam path before being provided to the target location.

12. The method of claim 5, wherein determining a property of the amplified light beam comprises determining a beam width and a waist location of the amplified light beam, and adjusting the adaptive optic comprises adjusting the adaptive optic based on the determined beam width and waist location such that the beam width and waist location remain constant.

13. A system for an extreme ultraviolet (EUV) light source, the system comprising:

an optical amplifier comprising a gain medium positioned on a beam path, the optical amplifier configured to receive a light beam at an input and to emit an output light beam for an EUV light source at an output;

a feedback system comprising a sensor, the sensor positioned at the output of the optical amplifier and positioned to receive the output light beam emitted by the optical amplifier, the sensor configured to measure a property of the output light beam and to produce a feedback signal based on the measured property; and an adaptive optic positioned in the beam path, the sensor being between the output of the amplifier and the adaptive optic, and the adaptive optic being configured to receive the feedback signal and to adjust a property of the output light beam in response to the feedback signal.

14. The system of claim 13, wherein the feedback system measures one or more of a power of the output light beam, a shape of the output light beam, and a size of the output light beam.

15. The system of claim 13, further comprising a second optical amplifier comprising a gain medium, and wherein the adaptive optic is positioned between the second optical amplifier and the optical amplifier.

16. The system of claim 13, wherein the adaptive optic comprises a variable radius mirror (VRM).

17. The system of claim 13, further comprising a second adaptive optic, and wherein the adaptive optic and the second adaptive optic each comprise a variable radius mirror (VRM).

18. The system of claim 13, further comprising a spatial filter on the beam path and between the second optical amplifier and the optical amplifier.

19. The system of claim 13, further comprising:
a vacuum chamber;
a target material delivery system that directs target material toward a target location in the vacuum chamber, the target location receiving the output light beam, and the target material comprising a material that emits extreme ultraviolet light when converted to plasma; and
a collector that receives and directs the emitted extreme ultraviolet light.

20. The system of claim 13, wherein the property is a location of a beam waist of the output light beam, and the adaptive optic is a beam path length adjuster configured to change a length of the beam path in response to the feedback signal.

* * * * *